(12) United States Patent
MacKenzie et al.

(10) Patent No.: US 11,393,329 B2
(45) Date of Patent: *Jul. 19, 2022

(54) METHOD, DIGITAL TOOL, DEVICE AND SYSTEM FOR DETECTING MOVEMENTS OF OBJECTS AND/OR LIVING BEINGS IN A RADIO RANGE, IN PARTICULAR OF AN INDOOR AREA

(71) Applicant: SIEMENS SCHWEIZ AG, Zürich (CH)

(72) Inventors: Kyle MacKenzie, Lincoin, RI (US); Alejandro Ramirez, Munich (DE); Corina Kim Schindhelm, Munich (DE)

(73) Assignee: SIEMENS SCHWEIZ AG, Zürich (CH)

( * ) Notice: Subject to any disclaimer, the term of this patent is extended or adjusted under 35 U.S.C. 154(b) by 7 days.

This patent is subject to a terminal disclaimer.

(21) Appl. No.: 16/413,781

(22) Filed: May 16, 2019

(65) Prior Publication Data

US 2019/0272741 A1 Sep. 5, 2019

Related U.S. Application Data

(63) Continuation of application No. 15/521,405, filed on Apr. 24, 2017, now Pat. No. 10,410,511.

(30) Foreign Application Priority Data

| Oct. 31, 2014 | (EP) | 14191345 |
| Aug. 20, 2015 | (EP) | 15181832 |
| Aug. 20, 2015 | (EP) | 15181834 |

(51) Int. Cl.
 G08C 17/02 (2006.01)
 G08B 13/24 (2006.01)
(Continued)

(52) U.S. Cl.
 CPC .......... *G08C 17/02* (2013.01); *G01S 13/003* (2013.01); *G01S 13/56* (2013.01); *G01S 13/88* (2013.01);
(Continued)

(58) Field of Classification Search
 CPC ............... A61B 5/0006; A61B 5/0022; B64D 45/0015; G01C 21/206; G01S 5/0252;
(Continued)

(56) References Cited

U.S. PATENT DOCUMENTS 5,546,087 A * 8/1996 Martin Neira ........ G01S 13/003
 342/120
6,029,154 A 2/2000 Pettitt
(Continued)

FOREIGN PATENT DOCUMENTS

CN 1327539 A 12/2001
CN 101821646 A 9/2010
(Continued)

OTHER PUBLICATIONS

Chinese Office Action dated Aug. 28, 2019 for Application No. 201580059076.4.
(Continued)

*Primary Examiner* — Stephen R Burgdorf
(74) *Attorney, Agent, or Firm* — Schmeiser, Olsen & Watts LLP (57) ABSTRACT

A method, digital tool, device, and system for detecting movements of objects and/or living beings in a radio range, which enables easily with a minimum of hardware complexity an automated movement detection based on a Single-Sensor, is provided. The method includes collecting as input data for the movement detection based on received radio signals of an intended or unintended communication between a transmitting radio terminal being mobile or fixed
(Continued)

and a receiving local fixed radio device in the radio range "Received Signal Strength" values related quantities, determining a change in the received radio signals, which are derived from the facts that the movement influences the transmitted radio signal in the radio range based on the RSS-values related quantities by the indication of a statistical parameter value, and assessing the statistical parameter value until the statistical parameter value in accordance with a threshold check provides a reliable statement for controlling purposes.

24 Claims, 6 Drawing Sheets

(51) Int. Cl.
G01S 13/00 (2006.01)
G01S 13/56 (2006.01)
G01S 13/88 (2006.01)

(52) U.S. Cl.
CPC ......... *G08B 13/24* (2013.01); *G08B 13/2491* (2013.01); *G08C 2201/32* (2013.01)

(58) Field of Classification Search
CPC .......... G01S 5/10; G01S 13/003; G01S 13/56; G06K 9/00288; G06K 9/00771; G08B 13/24; G08B 13/2491; G08C 17/02; G08C 2201/32; H04L 67/36; H04W 4/023; H04W 4/025; H04W 12/12; H04W 64/00
USPC ...................................................... 340/552
See application file for complete search history.

(56) References Cited

U.S. PATENT DOCUMENTS

| | | | |
|---|---|---|---|
| 7,884,727 B2 | 2/2011 | Tran | |
| 8,660,578 B1* | 2/2014 | Yang | G01S 13/003 455/456.1 |
| 9,311,793 B2 | 4/2016 | Lohbihler | |
| 2001/0029319 A1* | 10/2001 | Kazlausky | G16H 40/67 600/300 |
| 2003/0218919 A1 | 11/2003 | Arita | |
| 2004/0038677 A1 | 2/2004 | Avery | |
| 2004/0080415 A1 | 4/2004 | Sorensen | |
| 2005/0055568 A1 | 3/2005 | Agrawala et al. | |
| 2005/0130668 A1 | 6/2005 | Cameron | |
| 2005/0157327 A1* | 7/2005 | Shoji | G06K 15/408 358/1.14 |
| 2006/0265444 A1 | 11/2006 | Shiomi et al. | |
| 2008/0303956 A1 | 12/2008 | Nakagawa | |
| 2011/0280293 A1 | 11/2011 | Chevalier et al. | |
| 2011/0309933 A1 | 12/2011 | Marino | |
| 2012/0033572 A1 | 2/2012 | Bamberger et al. | |
| 2012/0146788 A1* | 6/2012 | Wilson | G08B 13/02 340/539.23 |
| 2012/0192275 A1 | 7/2012 | Oliver | |
| 2012/0286999 A1* | 11/2012 | Haimerl | G01S 5/0252 342/464 |
| 2012/0319844 A1* | 12/2012 | van Doorn | G01S 13/003 340/541 |
| 2013/0162459 A1* | 6/2013 | Aharony | G01S 13/04 342/27 |
| 2014/0011518 A1 | 1/2014 | Valaee | |
| 2014/0140231 A1* | 5/2014 | Haiut | G08B 13/187 370/252 |
| 2014/0187270 A1* | 7/2014 | Zinin | H04B 17/318 455/456.3 |
| 2014/0240223 A1* | 8/2014 | Lake | G06F 3/011 345/156 |
| 2014/0247179 A1 | 9/2014 | Furuskog et al. | |
| 2014/0281779 A1* | 9/2014 | Wellman | G01S 5/06 714/746 |
| 2015/0244793 A1 | 8/2015 | Lee | |
| 2015/0288688 A1 | 10/2015 | Derakhshani | |
| 2016/0088438 A1* | 3/2016 | O'Keeffe | H04W 4/21 455/456.2 |
| 2016/0178741 A1 | 6/2016 | Ludlow | |
| 2017/0309146 A1 | 10/2017 | Mackenzie et al. | |

FOREIGN PATENT DOCUMENTS

| | | |
|---|---|---|
| CN | 102414573 A | 4/2012 |
| CN | 103891369 A | 6/2014 |
| CN | 103891396 A | 6/2014 |
| WO | WO 2013164628 A1 | 11/2013 |

OTHER PUBLICATIONS

Cottingham D.N.: Vehicular wireless communication, Technical Report, No. 741, University of Cambridge, Computer Laboratory, Jan. 2009.
Rein T.: Energy and Time Efficient Link-Quality Estimation for Wireless Sensor Networks, Master Thesis, Apr. 2007.
International Search Report for PCT/EP2015/075305; International Filing Date: Oct. 30, 2015; 13 pgs.
Wikipedia: Fresnel Zone—https://web.archive.org/web/20141029114117/https://en.wikipedia.org/wiki/Fresnel_zone (for Oct. 29, 2014) (Year: 2014).
Non-Final Office Action dated Apr. 4, 2018 for U.S. Appl. No. 15/521,405.
Final Office Action dated Nov. 26, 2018 for U.S. Appl. No. 15/521,405.
Notice of Allowance dated Apr. 30, 2019 for U.S. Appl. No. 15/521,405.
Chinese Office Action dated Oct. 19, 2020 for Application No. 201580059076.4.

\* cited by examiner

METHOD, DIGITAL TOOL, DEVICE AND SYSTEM FOR DETECTING MOVEMENTS OF OBJECTS AND/OR LIVING BEINGS IN A RADIO RANGE, IN PARTICULAR OF AN INDOOR AREA

CROSS-REFERENCE TO RELATED APPLICATIONS

This application is a continuation application of U.S. application Ser. No. 15/521,405, filed Apr. 24, 2017, and entitled "METHOD, DIGITAL TOOL, DEVICE AND SYSTEM FOR DETECTING MOVEMENTS OF OBJECTS AND/OR LIVING BEINGS IN A RADIO RANGE, IN PARTICULAR OF AN INDOOR AREA," which claims priority to PCT Application No. PCT/EP2015/075305, having a filing date of Oct. 30, 2015, which is based upon and claims priority to EP Application No. 15181832.5, having a filing date of Aug. 20, 2015, EP Application No. 15181834.1, having a filing date of Aug. 20, 2015, and EP Application No. 14191345.9, having a filing date of Oct. 31, 2014. The entire contents of all priority documents are incorporated herein by reference.

FIELD OF TECHNOLOGY

The following relates to a method for detecting movements or a lack of movements of objects and/or living being in a radio range which influence radio signals of at least one radio terminal transmitted on a number of radio channels, received by a local fixed radio device in the radio range. The methods involve starting a notification procedure when a value of at least one parameter describing at least one property of at least one radio channel are collected for each time interval out of a predetermined number of time intervals, a value of a statistical parameter is derived from the set of parameters the values of the statistical parameters is compared with a threshold value, and, if the comparison yields a predefined result, a notification procedure is started.

BACKGROUND

For detecting movements of objects and/or living beings in a limited area, in particular of an indoor area many different approaches (e.g. methods, systems etc.) have been tried, but all of them have limitations.

Talking in the following about "movement detection" means in the context of the application a "movement and consequently presence detection". The reason for this is: When e.g. only the movement of a human or animal inside a room is detected (movement detection; "only" means there is e.g. no camera showing whether the movement comes originally from the human or animal), then the statement which can be made only for sure is that somebody or something is in the room (presence detection; but for the decision, whether the detected movement goes back to a human or animal, more especially sensor-related information is necessary).

A limited area besides the mentioned indoor area but outside of a building is for example a radio range, whereby the limitation is given by the radio coverage.

A first obviously known approach for movement detection is based on a simple motion detector (i.e. Passive Infra-Red sensor—PIR sensor). Such a simple motion detector will be a cheap and simple way to detect if a person is in a room as a typical indoor area. However, in order to cover a whole apartment as another larger indoor area, one sensor per each room has to be set up, because PIR sensors cannot see through walls. This will require setting up data communication and power for each of the sensors, as well as looking for suitable positions for said sensors.

A very innovative alternative to the "simple motion detector"-based scenario is the use of gas sensors built into an apparatus to detect the presence of people. The main disadvantage of such an approach is that it will take several minutes to detect such a presence, which is undesirable when controlling the lighting of the apartment. It should be mentioned that at the moment this approach cannot be found in any commercial devices.

Yet another approach to the "simple motion detector"-based scenario is to detect the use of equipment inside the apartment, for example switching on and off televisions, tablets or cooking appliances. While this would certainly be a positive indication of the presence of somebody in the apartment, this approach also has an undesirable delay especially if no equipment is used, which would not allow it to be used for applications such as turning on lighting.

Even another approach which would trigger home automation equipment in a similar fashion to the "simple motion detector"-based scenario, and one that can already be found in the market, is to program beforehand the time in which the apartment will be occupied, so that the thermostat and lighting may be turned on in advance. Unfortunately, people don't always go in and out of the apartment the exact same minute, leading to energy waste when the programmed time has arrived but the people haven't.

Lastly, if people were forced to always carry a device with them (for example a smartphone), the device's sensors and wireless communication may be used for presence detection. However, this would force people to always carry such devices with them, having them turned on at all time and charged. This presents an important limitation when detecting children and pets inside the apartment.

Other approaches may exist. But none of these fulfill the following requirements raised out of the above reflection of the different approaches:
Fast acting,
Covering the limited area (e.g. a radio range), in particular the whole apartment,
People carrying no devices
Off-the-shelf hardware and
Single-Sensor.

SUMMARY

An aspect relates to a method, a digital tool, a device and a system for detecting movements of objects and/or living beings in a radio range, in particular of an indoor area, which enables easily with a minimum of hardware complexity an automated movement detection based on a Single-Sensor, which fulfills in addition the other requirements cited above.

It is further an aspect of the invention to propose a method for detecting movements of objects and/or living beings in a radio range, in particular of an indoor area, which compares values of various parameters, and, in particular, RSS-VRQ, SPV and THV, and if the comparison yields a predefined result, a notification procedure is started. This object is solved based on the method.

It is further an aspect of the invention to propose a computer program product (non-transitory computer readable storage medium having instructions, which when executed by a processor, perform actions) comprising a program code for executing the method for detecting movements of objects and/or living beings in a radio range (or lack of movements) when run on at least one wireless enabled device or processor. This aspect is solved based on the computer program product.

Preferred embodiments of the invention propose a Method or Digital Tool or Device or System that enables each an automated, preferably hard- and software-related, For a wireless-based movement detection of objects and/or living beings, e.g. people, influencing transmitted radio signals of at least one radio terminal in a radio range, e.g. an indoor area—especially different rooms inside of an apartment, by:

(i) Collecting as input data for the movement detection based on received radio signals, in particular "Wireless Local Area Network [WLAN]"/"Wireless Fidelity [WiFi]"-signals according to IEEE 802.11, of an intended or unintended communication between a transmitting radio terminal being mobile or fixed and a receiving local fixed radio device in the radio range a "Received Signal Strength [RSS]"-values related quantity, e.g. a "Received Signal Strength Indication [RSSI]"-quantity, a "Signal to Noise Ratio [SNR]"-quantity, a "Channel Quality Indication [CQI]"-quantity, a "Packet Reception Rate [PRR]"-quantity, a "Packet Loss Rate [PLR]"-quantity, a "Signal to Interference Ratio [SIR]"-quantity and/or a "Signal to Interference plus Noise Ratio [SINR]"-quantity, For a wireless-based movement detection following the wireless-link estimation with its metrics, the choice of an appropriate characteristic is fundamental. A very basic indicator—besides for example the "Received Signal Strength Indication [RSSI]", the "Signal to Noise Ratio [SNR]", the "Channel Quality Indication [CQI]", the "Signal to Interference Ratio [SIR]" and the "Signal to Interference plus Noise Ratio [SINR]"—but also important and useful indicator is the "Packet Reception Rate [PRR]" with its complement, the "Packet Loss Rate [PLR]". The "Packet Reception Rate [PRR]" is basically the number of received packets at a receiver in relation to all the sent packets by a transmitter (ii) Determining a change in the received radio signals, which are derived from the facts that the movement influences the transmitted radio signal in the radio range, e.g. by at least one of reflection, refraction, diffraction and absorption, based on the collected "Received Signal Strength [RSS]"-values related quantity by the indication of a statistical parameter value, e.g. a value parameterized by the average of the squared or absolute differences from the mean or the square root of the average of the squared differences from the mean, and (iii) Assessing the determined statistical parameter value until the determined statistical parameter value in accordance with a threshold check provides a reliable statement, which is preferably at least one detection data (digital form of the statement) or at least one detection signal (analogue form of the statement), particularly being used for controlling purposes, e.g. a YES-/NO-statement representing for instance a Switched ON/OFF—respectively Switched OFF/ON—status of an appliance.

Such invention embodiments use a simple existing "WLAN/WiFi"-device in listening mode, and run software on only this equipment. No additional hardware or software components are required, except for any standard off-the-shelf "WLAN/WiFi"-device in the environment to be transmitting anything. Thus it maintains low cost and simplicity, which are important factors.

Instead of the preferred embodiment based on the "Wireless Local Area Network [WLAN]"/"Wireless Fidelity [WiFi]"-communication according to IEEE 802.11 other embodiments are possible, which are based on any wireless communication according to, for example, "Bluetooth", "DECT" and "ZigBee".

Also, it is assumed that there will be wireless traffic coming from devices located physically within or around the radio range as the desired detection zone. If no traffic exists, the local fixed radio device may generate it itself. As an example implementation, the desired detection zone might be a home (house, appartement etc.) and the local fixed radio device on which the subject matter of embodiments of the invention implemented is for instance a smart television. Other wireless devices in the home that can generate wireless traffic could include an access point, one or more laptop computers, mobile phones, tablets, and other smart devices.

The controlling purpose could be the automatically controlling of domestic appliances or facilities, in particular heating, climate control, lighting or security facility, or in general all aspects concerning home automation and home entertainment.

A highly advantageous feature of embodiments of the invention is that no hardware changes will be required. A motion sensor can be built using for example a standard WLAN-enabled device. Obtaining such a feature through only software will provide a great strategic advantage for a product. It may be used to monitor secured areas in which WLAN-infrastructure is available. It may be used for home automation for example to turn on or off a lot of domestic appliances or facilities, in particular the heat, climate, security or lighting of an apartment.

Another advantageous feature of embodiments of the invention is that through the remote access of RSS-related data, one simple device can detect movement on a whole building, using the building WLAN-infrastructure as sensors.

Yet another important advantage over other systems is that no calibration is required, as it will do a comparison of the signal against itself.

In embodiments of the invention, the specific nature of the invention is that:

(1) The person, whose movement in the radio range with the transmitting radio device and the receiving radio device should be/is detected, must not carry themselves any electronic device transmitting the radio signals.

(2) The movement detection doesn't provide any information to individually identify the person or persons in the radio range, just know if there is anybody inside (presence detection; cf. the remarks above) and to identify the specific place within the radio range in which person is or the persons are located.

(3) It is enough to have a single point in the radio range, the local fixed radio device, working as a sensor for the radios signals and the changes therein; for this reason one speaks of a "single-sensor".

(4) The only information being required in the local fixed radio device is a "Received Signal Strength [RSS]"-values related quantity such as e.g. a "Received Signal Strength Indication [RSSI]"-quantity. The RSSI-quantity is commonly provided by IEEE 802.11 devices and can be retrieved for use in applications without hardware modification and, in most cases, also without firmware modification.

Signal strength is affected by many factors in the environment. Metal objects, for example, may reflect the signal and create constructive or destructive interference. Water, as well as other materials, is also known to absorb RF-signals in the frequency range of IEEE 802.11. These properties are used to determine when there is movement in the area. If the RSSI-quantity remains relatively stable it is assumed that there is no movement. If the RSSI-quantity is unstable then there may be movement.

In a typical indoor environment, there will be objects and infrastructure of many different materials reflecting the signal. This multi-path effect means that the RSSI-quantity will be sensitive to environmental changes outside the line of sight between the transmitter and receiver. This means that the solution according to embodiments of the invention is advantageous for detecting movements in an entire room or possibly multiple rooms depending on the physical placement of the wireless devices.

This however will only work if the measuring WLAN/WiFi-device is static, which is the case due to the local fixed radio device. Moving the device will lead to great changes in the reflections received, even if no obstacles in the room were moving.

(5) For getting ready to detect a movement inside the radio range and after the RSS-related information is obtained, signal processing will be required. To allow algorithms to work on any (previously unknown) environment, only a parameter "change" is measured. Since the movement in the room will change the amount and the intensity of the reflections, only the newly arriving data to previous data is constantly compared. By doing this, no calibration is required and obtaining a baseline with an empty room is not needed.

Also advantageously, various embodiments of the invention provide for a computer program product comprising a program code for executing the method for detecting movements or lack of movements when run on at least one wireless enabled device or processor, in its embodiments. Processors can, for example, without limitation, include a CPU or any other appropriate processor.

Also, advantageously, various embodiments of the invention provide for a data carrier for storing the computer program product. The data carrier can use any appropriate storage media, for example, without limitation, a USB, DVD, or other readable media.

Additional embodiments of the invention provide for a method for detecting movements or a lack of movements of objects and/or living being in a radio range which influence radio signals of at least one radio terminal transmitted on a number of radio channels, received by a local fixed radio device in the radio range whereby a value of at least one parameter describing at least one property of at least one radio channel are collected for each time interval out of a predetermined number of time intervals, a value of a statistical parameter is derived from the set of parameters the values of the statistical parameters is compared with a threshold value, and, if the comparison yields a predefined result, a notification procedure is started, preferably wherein a predefined result is that the chaos index value exceeds or equals the threshold value in the case of detecting movements or in the case of detecting a lack of movements falling below the threshold value. More preferably, the notification procedure comprises a contacting, in particular via telephone or email, a predefined entity, or/and switching on electrical appliances, in particular a camera or/and a siren or/and light or/and stereo system.

Of a sui generis design the subject matter of embodiments of the invention is preferably on one side either a Method or a Digital Tool and on the other either a Device or a System.

The Digital Tool according to the claim 7 includes a program module running on a processor, whereby the program module is preferably downloadable from a server or cloud or is uploadable via a "Universal Serial Bus [USB]"-stick or in addition is stored, uploadable or downloadable into a storage media being inserted or insertable into the Device including a processor and a radio interface. Regarding the cited options (alternatives) the Digital Tool is preferably an "App" (Application Software) running on processors of different radio devices, which could be a desktop PC or an "All-In-One" PC incorporating each a radio interface, a smartphone, a notebook, a tablet etc. In other words the Digital Tool is preferably a purpose-designed computer program product (non-transitory computer readable storage medium having instructions, which when executed by a processor, perform actions). The Digital Tool can be sold or distributed separately or in common with the Device or the System for detecting movements. Such a Device or System could be for example a telecommunication appliance, a domestic appliance, a medical appliance, a home automation system, a home entertainment system etc.

Further expedient improvements of the invention associated with corresponding advantages are stated in the other dependent claims.

BRIEF DESCRIPTION

Some of the embodiments will be described in detail, with reference to the following figures, wherein like designations denote like members, wherein.

DETAILED DESCRIPTION

Figure 1:
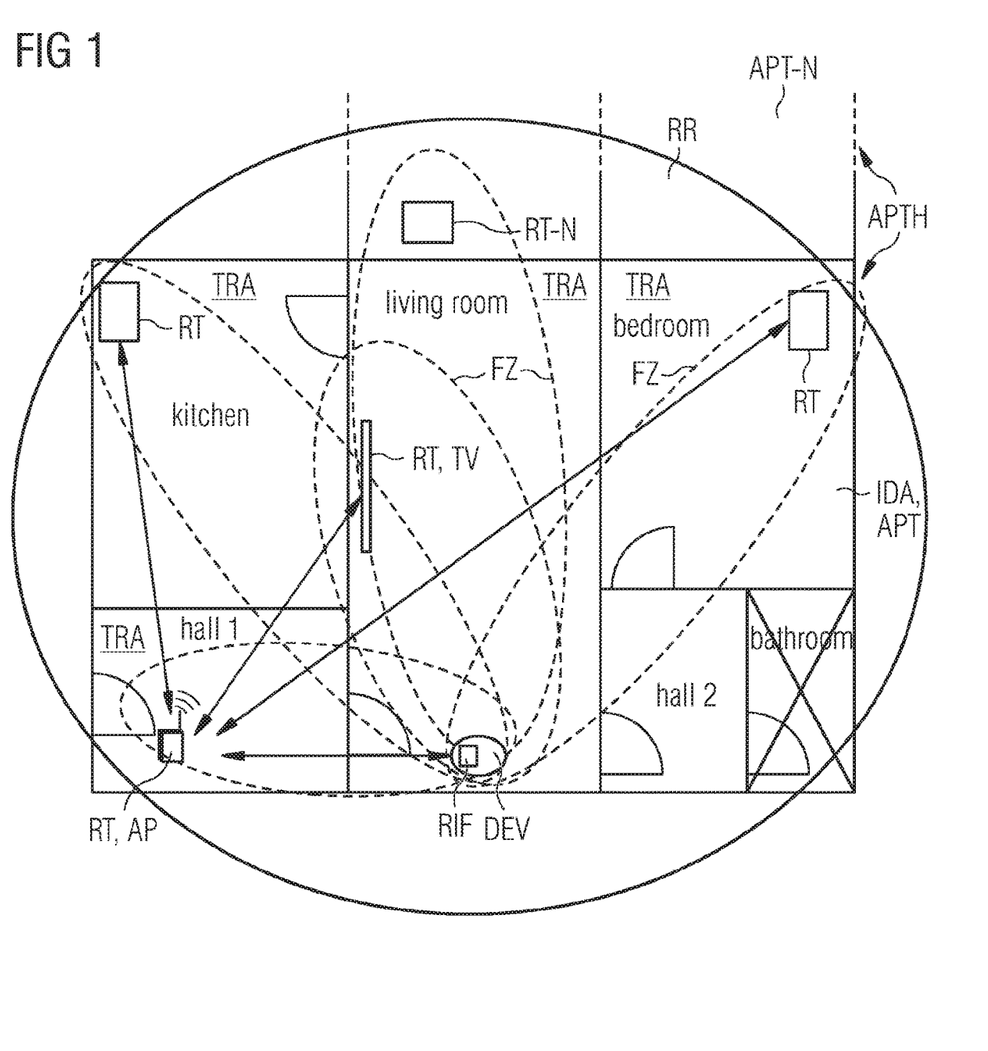
FIG. 1 depicts detecting movements of objects and/or living beings in a radio range.

FIG. 1 shows a scenario for detecting movements of objects and/or living beings in an indoor area IDA such as e.g. an apartment APT of an apartment house APTH. A living being which movement in the indoor area IDA is detected could be for example a human or an animal, whereby an object which movement in the indoor area IDA is detected could be for example an interior blind or robot machines such as robot vacuum cleaner.

Adjacent to the apartment APT is a neighbor apartment APT-N. The depicted apartments APT contain several rooms, six rooms in the apartment APT and two rooms in the neighbor apartment APT-N being graphically outlined. In both apartments APT, APT-N a local area wireless infrastructure is deployed. This could be for instance a "Wireless Local Area Network [WLAN]", but also other wireless technologies are possible such as Bluetooth, DECT, ZigBee, etc. The six rooms in the apartment APT are an entrance hall identified in FIG. 1 by "hall 1", a kitchen, a living room, a bedroom, a dressing room identified in FIG. 1 by "hall 2" and a bathroom, whereby the two rooms of the neighbor apartment APT-N are not identified in detail.

Due to the "Wireless Local Area Network" deployed in each apartment a radio range RR or coverage area is given, which is not inevitable limited to the apartment APT (cf. the depiction in the FIG. 1 where the radio range RR or the coverage area is extended to the neighbor apartment APT-N). In general the radio range RR is essentially given by the maximum distance between a transmitting device transmitting radio signals to a receiving device receiving the transmitted radio signals according to radio frequency "Line-of-Sight [LoS]". Fresnel zones FZ are ellipsoide shaped areas between the antennas of two devices in which the presence of an object will generate destructive reflections, causing an important reduction in the energy transferred. Since the radio signals are transmitted e.g. on a number of radio channels and the radio signal transmission can be realized in both directions the two devices are called transceiving devices. This situation is depicted in the FIG. 1 by a double-arrow and/or the Fresnel ellipse FZ (an ellipse being the 2D representation of an ellipsoid) between two transceiving devices, whereby each the double-arrow indicates an intended communication between the two transceiving devices. This however means that in those cases, where only the Fresnel ellipse or zone FZ without the double-arrow is shown, an unintended communication between the two transceiving devices is present.

The "Wireless Local Area Network" deployed in the apartment APT is formed by several fixed or mobile radio terminals RT, which may be distributed across the apartment APT, and a local fixed radio device DEV with a radio interface RIF encompassing a Radio Program Module, which is a software module sometimes called a driver, which is based on the wireless technology being used. The same could be possible in principle for the neighbor apartment APT-N. However as depicted in the FIG. 1 there is only one fixed or mobile radio terminals RT-N in a room of this apartment APT-N, whereby this radio terminals RT-N transmits unintendedly radio signals to the local fixed radio device DEV in the apartment APT (cf. depicted by the Fresnel ellipse between both devices). If a radio signal is not going to or coming from a dedicated network (e.g. the network within the apartment APT), the signal could be completely ignored. This is done through analysing the sending and receiving addresses in the header of a wireles frame, and will guarantee that movement in a neighboring appartment will have no effect on the occupancy detection.

With respect to the apartment APT shown in the FIG. 1 there are four radio terminals RT located in the hall 1, the kitchen, the living room and the bedroom. In the living room there is also located the local fixed radio device DEV. From the cited four radio terminals RT that one in the hall 1 is designed as a wireless access point AP, which is the interface of the "Wireless Local Area Network" to outside networks, e.g. a wired network for Internet and telephony applications. One radio terminal RT of the remaining three radio terminals RT for example that one in the living room is implemented in a television TV. The two other radio terminals RT in the bedroom and in the kitchen could be each for example a tablet or a smartphone. All three remaining radio terminals RT have a direct connection to the wireless access point AP, which is represented by the double-arrows.

In addition to this direct connections the wireless access point AP establishes and maintains each an intended communication with the other three radio terminals RT and the local fixed radio device DEV in the apai linent APT although the corresponding Fresnel ellipse FZ is not depicted in each case.

As the local fixed radio device DEV listens to all the radio terminals at the same time, it is able to achieve a "detection area", which is presented substantially by the coverage of all Fresnel ellipses FZ. In reality, the "detection area" is not an absolute limit to where the movement can be detected, as walls and furniture will have some effect on the signal. But it is a very good approximation. Under some circumstances, some rooms may not be covered at all by the "detection area". This for instance is the case regarding the bathroom. Movement in rooms that don't have a wireless device may sometimes be detected, if the room is covered (or partially covered) by the wireless propagation of a signal. An example of such a situation would be the hall 2.

Another important, but optional, element is for the local fixed radio device DEV to be capable of a "monitor mode". The monitor mode is a capability present in most WLAN-devices which allows the reception of WLAN frames not directed toward for the local fixed radio device DEV.

One part of the "monitor mode" is done through hardware and another part through software. When the "monitor mode" is enabled an internal MAC filter will stop filtering the frames sent towards the device and will start forwarding the frames directed to other devices.

There are a lot of other implementations possible which differ from the present one. For example the "detection area" could essentially be as large as the radio range which means that more radio termionals are necessary or significantly smaller which decreases the chances for detecting movements in the radio range.

To implement a movement detection in the apartment APT with the "Wireless Local Area Network" existed therein a measurement of the received signal strength inside the local fixed radio device DEV with a commercial off-the-shelf radio interface RIF is used. In order to get the movement detection the only information being required is a "Received Signal Strength [RSS]"-values related quantity such as a "Received Signal Strength Indication [RSSI]"-quantity, a "Signal to Noise Ratio [SNR]"-quantity, a "Channel Quality Indication [CQI]"-quantity, a "Packet Reception Rate [PRR]"-quantity, a "Packet Loss Rate [PLR]"-quantity, a "Signal to Interference Ratio [SIR]"-quantity and/or a "Signal to Interference plus Noise Ratio [SINR]"-quantity. All quantities are known generally. However the RSSI-quantity, which is preferably used, is commonly provided by IEEE 802.11 devices and can be retrieved for use in applications without hardware modification and, in most cases, also without firmware modification.

Signal strength is affected by many factors in the environment. Metal objects, for example, may reflect the signal and create constructive or destructive interference. Water, as well as other materials, is also known to absorb RF-signals in the frequency range of IEEE 802.11. These properties are used to determine when there is movement in the area. If the RSSI-quantity remains relatively stable it is assumed that there is no movement. If the RSSI-quantity is unstable then there may be movement.

In a typical indoor environment, there will be objects and infrastructure of many different materials reflecting the signal. This multi-path effect means that the RSSI-quantity will be sensitive to environmental changes outside the line of sight between the transmitter and receiver. This means that the solution according to embodiments of the invention is advantageous for detecting movements in an entire room or possibly multiple rooms depending on the physical placement of the wireless devices.

Figure 2:
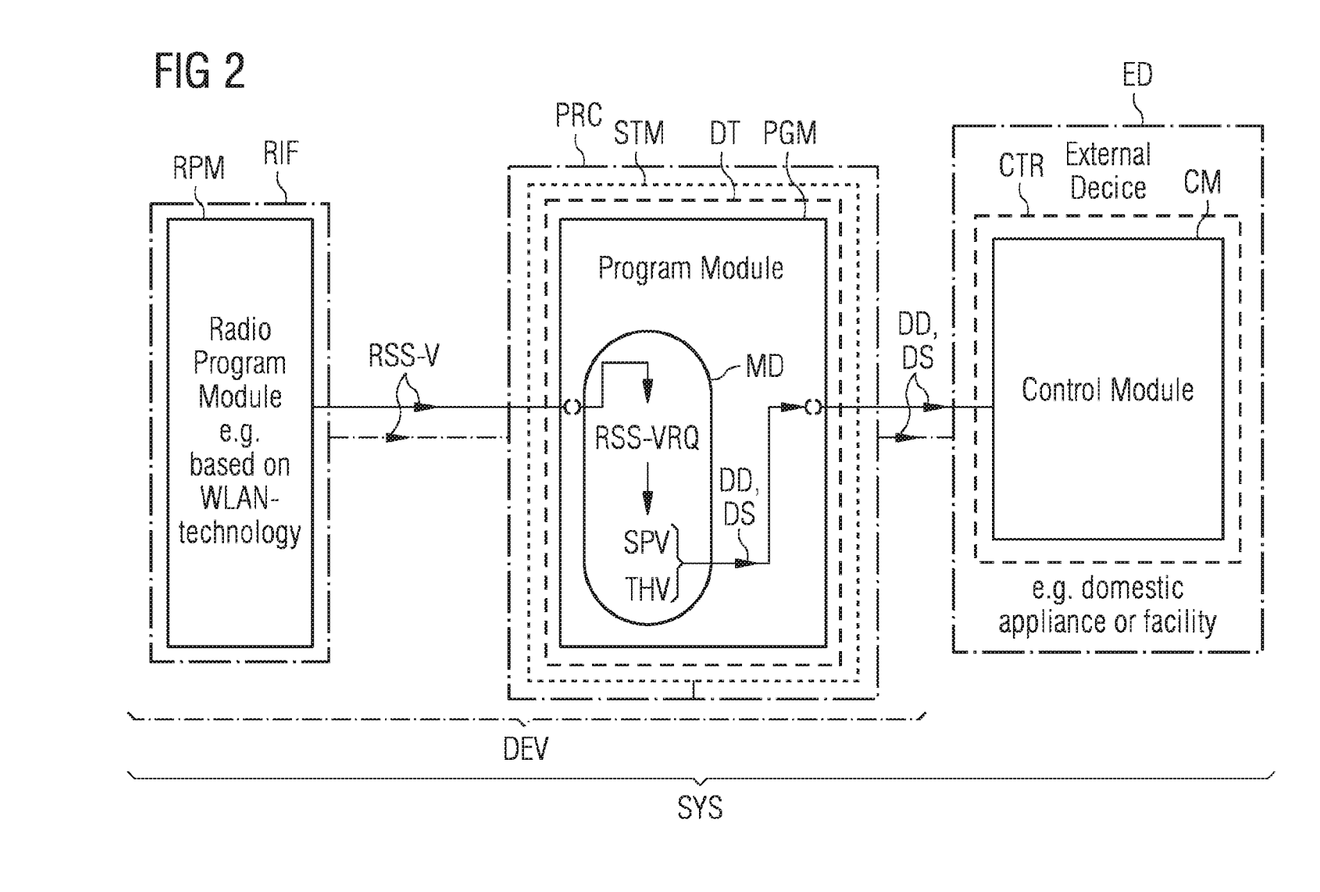
FIG. 2 depicts a layout of an embodiment of a Digital Tool, a Device and a System for detecting movements of objects and/or living beings in the radio range according to the FIG. 1.

FIG. 2 shows a layout based on functional blocks of a Digital Tool DT, the local fixed radio device DEV called as "Device" and a System SYS for detecting movements of objects and/or living beings in the radio range RR according to the FIG. 1 with an "functional block"-interaction on software respective module level (blocks with continuous lines) and on hardware respective device or system level (blocks with dash-dotted lines). All depicted blocks exist in the System SYS, whereas the blocks on the left side and in the middle of the FIG. 2 are part of the Device DEV.

The Digital Tool DT includes (regarding the mentioned software respective module level) a program module PGM being executable on a processor PRC, whereby the program module PGM is preferably downloadable from a server or cloud or is uploadable e.g. via a "Universal Serial Bus [USB]"-stick.

Furthermore (regarding the mentioned hardware respective Device or System level) it is possible that the Digital Tool DT respectively the program module PGM is stored, uploadable or downloadable into a computer-readable storage media STM being inserted or insertable into or integrated in the Device DEV with the processor PRC and the radio interface RIF as mentioned above. The computer-readable storage media STM is assigned to the processor PRC and forms with the processor PRC a common functional unit such that the processor PRC executes the program module PGM stored in the storage media STM.

Regarding the cited options (alternatives) the Digital Tool is preferably an "App" (Application Software) running on a processor of different radio devices, which could be a desktop PC or an "All-In-One" PC incorporating each a radio interface, a smartphone, a notebook, a tablet etc. In other words the Digital Tool is preferably a purpose-designed computer program product (non-transitory computer readable storage medium having instructions, which when executed by a processor, perform actions). The Digital Tool DT can be sold or distributed separately or in common with the Device DEV or the System SYS for detecting movements. Such a Device or System could be for example a telecommunication appliance, a domestic appliance, a medical appliance, a home automation system, a home entertainment system etc.

For the purpose of a movement detection MD executed by the program module PGM, when according to the scenario shown in the FIG. 1 and described above "Received Signal Strength [RSS]"-values RSS-V received for a number of time frames, in particular consecutive time frames, at the local fixed radio device DEV are input data either for the program module PGM of the Digital Tool DT being executable on the processor PRC or for the processor PRC executing the program module PGM stored in the storage media STM of the Device DEV respectively the System SYS. The input data is provided in the first case by a radio module RM and in the second case by the radio interface RIF.

With respect to the scenario shown in the FIG. 1 and described above the movement detection of objects and/or living beings in the radio range RR is done for all communications being intended or unintended in parallel or for a selected communication, whereby the selection of the communication is software-based/supported.

On the basis of the inputted RSS-values RSS-V the program module PGM of the Digital Tool DT being executable on the processor PRC or the processor PRC executing the program module PGM stored in the storage media STM of the Device DEV respectively the System SYS collects as input data for the movement detection MD regarding the number of time frames a number of RSS-values related quantities RSS-VRQ, in particular at least one of a number of "Received Signal Strength Indication [RSSI]"-quantities, a number of "Signal to Noise Ratio [SNR]"-quantities, a number of "Channel Quality Indication [CQI]"-quantities, a number of "Packet Reception Rate [PRR]"-quantities, a number of "Packet Loss Rate [PLR]"-quantities, a number of "Signal to Interference Ratio [SIR]"-quantities and a number of "Signal to Interference plus Noise Ratio [SINR]"-quantities.

Figure 3:
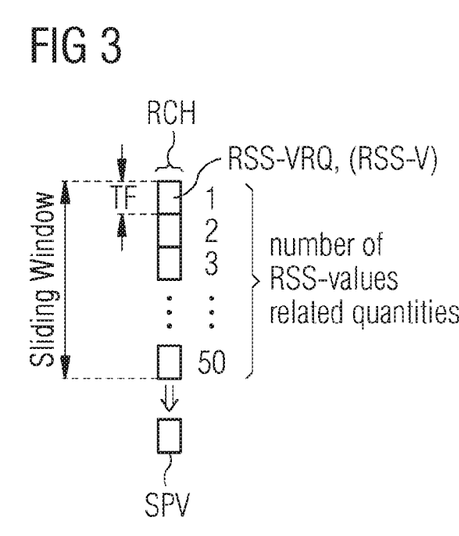
FIG. 3 depicts an embodiment, based on channel structure the evaluation of a change in the radio signals due to at least one of reflection, refraction, diffraction and absorption.
Figure 4:
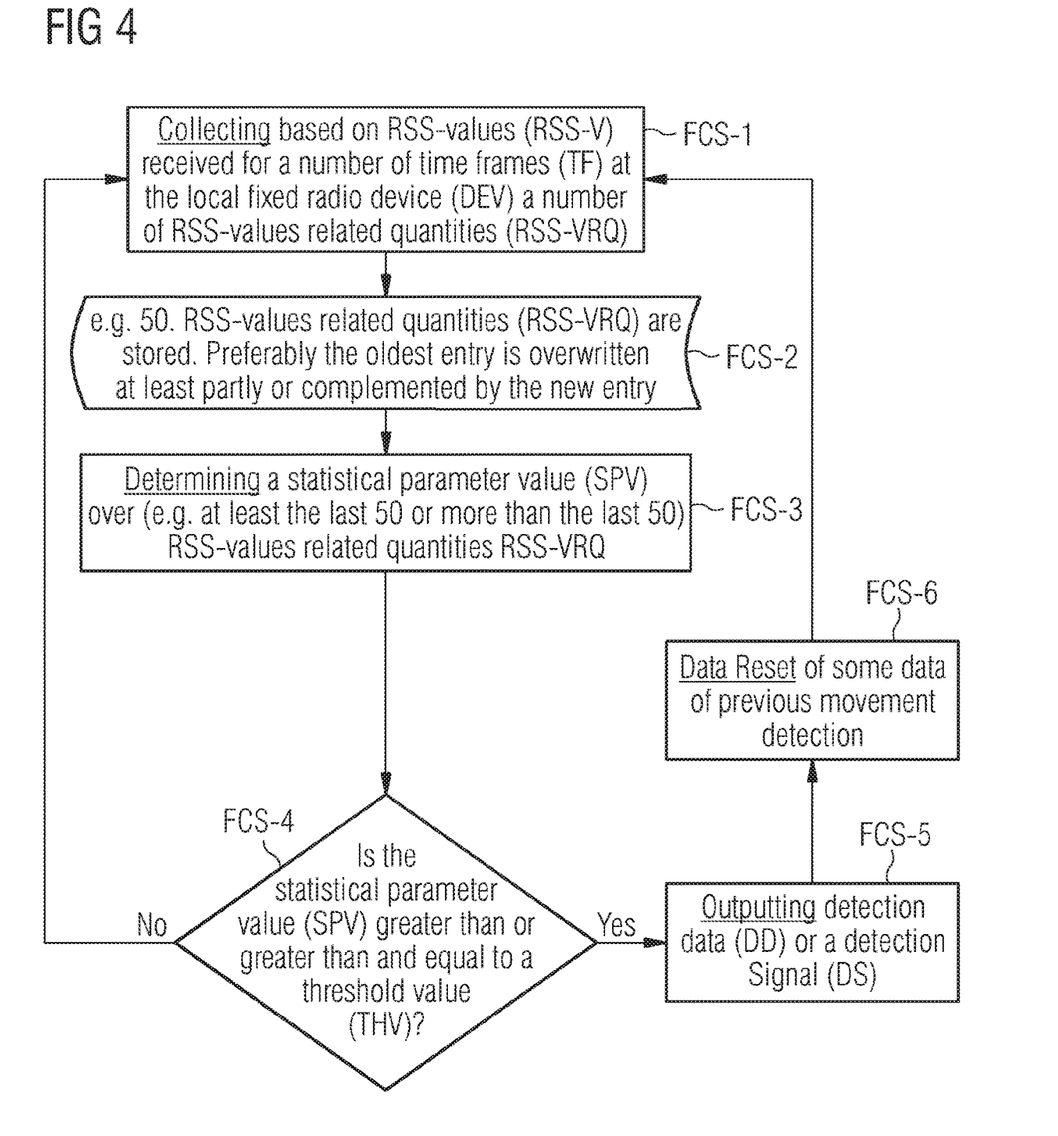
FIG. 4 depicts a flow chart for movement detection representing an algorithm of the Digital Tool respectively the program module according to the FIG. 2 using radio signals, in particular "Wireless Local Area Network [WLAN]"-technology based signals, measuring and evaluating the change according to the FIG. 3.

The movement detection MD based on influenced radio signals of at least one radio terminal RT transmitting the radio signals on a number of radio channels RCH in the radio range RR as such, which will be described in detail later on with regard to FIGS. 3 and 4, is characterized by a statistical parameter value SPV being determined and due to a comparison of the statistical parameter value SPV with a threshold value THV by at least one detection data DD or at least one detection signal DS being outputted and indicating movements influencing the transmitted radio signals. The indicating of a movement could be enlarged to alert or notify any number of other Systems or Devices about the status of movement based upon the supplied data. The Systems or Devices being notified could consist of anything that would benefit from the motion detection just being carried out.

The at least one outputted detection data DD or the at least one detection signal DS can be used for automatically controlling external devices ED such as domestic appliances or facilities, in particular heating, climate control, lighting or security facility, or in general for home automation and home entertainment.

According to a preferred embodiment concerning to this matter and thereby going back to the FIG. 1 in a terminal-related area TRA of the apartment APT, which is given by the kitchen, the living room, the bedroom and the hall 1, and in which each at least one of the cited radio terminals RT is located in, the external device ED can be controlled separately and/or independently due to each the detection data DD or the detection signal DS being generated by the Digital Tool DT, the Device DEV and/or the System SYS for detecting movements regarding each terminal-related area TRA in the radio range RR.

Thus for example, when with respect to the living room a detection data DD or a detection signal is generated due to a movement of a person, e.g. walking in the cited room, the lightning in this room can switched ON provided that it was switched OFF before. In parallel, when with respect to the bedroom another detection data or another detection signal DS is generated due to a further movement of another person, e.g. also walking in the cited room, the lightning in this room can switched OFF provided that it was switched ON before.

Due to this given example it can be easily understood that a numerous examples of use are conceivable, which could be used each as a further embodiment.

The external device ED comprises for this purpose a control module CM running on an "external device"-specific controller CRT. In this case the System SYS for detecting movements of objects and/or living beings in the radio range RR exists, which comprises the Device DEV and the external device ED with the controller CRT and the running control module CM thereon. For such a System SYS the external device ED respectively the controller CTR is connected with the device DEV respectively the processor PRC of the device DEV and forms a functional unit with the device DEV respectively the processor PRC of the device DEV such that at the moment the device DEV respectively the processor PRC of the device DEV is detecting a movement of a living being an automatic controlling of the external device is carried out via the controller CTR and the running control module CM thereon. Preferably the external device ED being currently switched off is switched on or being currently switched on is switched off.

The Device or Digital Tool DT based on the mentioned functional blocks could be deployed or installed onto any other device with the cited radio interface as long as this device is fixed. So for example, the radio terminal integrated in the television or the wireless access point itself could be appropriate candidates. The environment is also not limited to an anal intent. Subway tunnels or outdoor areas could also serve as potential locations. The algorithm itself does not have a maximum number of supported devices. This parameter is only limited by the hardware on which the algorithm is installed. It should also be mentioned that the Device or Digital Tool DT based on the mentioned functional blocks works independently of any encryption present.

Moreover the Device or Digital Tool DT based on the mentioned functional blocks could be designed such that the received signals will be catalogued depending on their source and destination. Thus as already mentioned above; if a signal is not going to or coming from a dedicated network, the signal could be completely ignored. This is done through analysing the sending and receiving addresses in the header of a wireless frame, and will guarantee that movement in a neighboring appartment will have no effect on the occupancy detection.

The algorithms and methods concerning the Digital Tool and implemented inside the Device take advantage of the existing wireless frames sent by the different devices inside the appartment. The WLAN-based occupancy detection is intrinsicly passive; it is not required to send a wireless frame of any kind to obtain a reading on the movement. Also of importance is that no additional software is required inside the devices (with the exception of the Device). If for some unexpected reason no wireless traffic exists, no occupancy detection can take place. For such cases, an application may be added to the Device to generate this wireless traffic whenever required.

The Device or Digital Tool DT based on the mentioned functional blocks is able to monitor all radio terminals in the radio range which are communicating intendedly or unintendedly to the appartment's wireless access point. This enables to limit the detection range to the one single appartment. Depending on the amount of radio terminals and the position of each radio terminal, the Device or Digital Tool DT based on the mentioned functional blocks can be able to detect movement in the whole apartment.

FIG. 3 shows based on channel structure the evaluation of a change in the radio signals due to at least one of reflection, refraction, diffraction and absorption. Based on the scenario shown in the FIG. 1 and described hereof at least one radio terminal RT transmits in the radio range RR, in particular relating each to the Fresnel zone FZ on a number of radio channels RCH radio signals, in particular "Wireless Local Area Network [WLAN]"-technology based signals, which are received each by the local fixed radio device DEV due to each an intended or unintended communication between the radio terminal RT and the local radio device DEV.

To evaluate a change in the radio signals due to at least one of reflection, refraction, diffraction and absorption it is necessary at the beginning to collect based on RSS-values RSS-V received for a number (e.g. 50) of time frames TF, in particular consecutive time frames TF, at the local fixed radio device a number of RSS-values related quantities RSS-VRQ, which corresponds to the number of time frames TF. The number of time frames is called a "Sliding Window", whereby the term "sliding" means that the number is variable.

The number of RSS-values related quantities RSS-VRQ are e.g. at least one of a number of "Received Signal Strength Indication [RSSI]"-quantities, a number of "Signal to Noise Ratio [SNR]"-quantities, a number of "Channel Quality Indication [CQI]"-quantities, a number of "Packet Reception Rate [PRR]"-quantities, a number of "Packet Loss Rate [PLR]"-quantities, a number of "Signal to Interference Ratio [SIR]"-quantities and a number of "Signal to Interference plus Noise Ratio [SINR]"-quantities, whereby it is preferred that the RSS-values related quantities RSS-VRQ are the number of "Received Signal Strength Indication [RSSI]"-quantities.

Then based on the number of RSS-values related quantities RSS-VRQ a statistical parameter value SPV is determined or calculated, which is preferably a value parameterized by the average of the squared differences from the mean being in other words the variance. But it is also possible (although less preferable) to determine or calculate a value parameterized by the average of the absolute differences from the mean or to determine or calculate the square root of the average of the squared differences from the mean being in other words the standard deviation. Moreover it also possible to that the statistical parameter value SPV is determined or calculated only for a fraction of the RSS-values related quantities RSS-VRQ, which means in conclusion that the statistical parameter value SPV is calculated at least for a fraction of the RSS-values related quantities RSS-VRQ.

The algorithm for analysis consists of collecting preferably RSSI-quantities over a "Sliding Window" of 50 time frames, corresponding to roughly one second, and computing the variance within the window. If this variance is over a certain arbitrary and/or experimentally or automatically determined value then a movement is detected.

The basis for this algorithm is that periods without movement should have a low variance and periods of measurement with movement should have a higher variance. The importance of using the variance is that it is not necessary to rely on any previous knowledge of the test location or a calibration period to decide if there is movement. This makes the analysis highly resistant to false positives resulting from changing environmental factors such as opened or closed doors, moved furniture, etc.

It can be illustrated well the importance of the use of the variance in the signal instead of some sort of comparison to a calibration period. If a comparison to a calibration period were used, it would be very difficult to detect instances when there is no movement but a new stability point such as when the second door was left open but there was little movement otherwise. It was found that, independent of the testing environment, the variance over a given period of time will not exceed a certain amount unless there is movement in the environment. Therefore it is avoided this problem which is very common in other movement detection algorithms. The variance mentioned here is only an example of the signal processing; many other options exist.

The actions to be triggered on a "detection event" may be determined in advance, or may even be determined dynamically in relation to other conditions like time of day or amount of sunlight outside. A further option is to select the action based on the value of the statistical value itself.

FIG. 4 depicts a flow chart for the movement detection MD being described in very rudimentary form with reference to the FIG. 2 representing an process (algorithm) of the Digital Tool DT respectively the program module PGM according to the FIG. 2 using radio signals, in particular "Wireless Local Area Network [WLAN]"-technology based signals, measuring and evaluating the change according to the FIG. 3.

In a first flow chart state FCS-1 based on RSS-values RSS-V received for a number (e.g. 50) of time frames TF, in particular consecutive time frames TF, at the local fixed radio device a number of RSS-values related quantities RSS-VRQ is collected, which corresponds to the number of time frames TF.

Then in second flow chart state FCS-2, e.g. 50, RSS-values related quantities RSS-VRQ are stored, whereby preferably the oldest entry is overwritten at least partly. Alternatively it is also possible to complement the old entry by the new entry.

In the following in a third flow chart state FCS-3 a statistical parameter value SPV over, e.g. at least the last 50 or more than the last 50, RSS-values related quantities RSS-VRQ is determined or calculated. The statistical parameter value SPV is as already mentioned preferably a value parameterized by the average of the squared differences from the mean being in other words the variance. But it is also possible (although less preferable) to determine or calculate a value parameterized by the average of the absolute differences from the mean or to determine or calculate the square root of the average of the squared differences from the mean being in other words the standard deviation.

Thereafter in a fourth flow chart state FCS-4 it is checked whether the determined or calculated statistical parameter value SPV is greater than or greater than and equal to a threshold value THV. If the answer of the comparison check is "NO", the movement detection process goes back to the first flow chart state FCS-1. However, if the answer of the comparison check is "YES", the movement detection process goes on with a fifth flow chart state FCS-5, in which detection data DD or a detection signal DS is outputted.

At this fifth flow chart state FCS-5 the movement detection process is finished, however if a new movement detection process need to be started again, some data, in particular and preferably those data generated in the flow chart for the movement detection MD beginning with the third flow chart state FCS-3 and ending with the fifth flow chart state FCS-5, of the finished movement detection process could be reset, which is done in a sixth flow chart state FCS-6, before it then goes back to the first flow chart state FCS-1.

Figure 5:
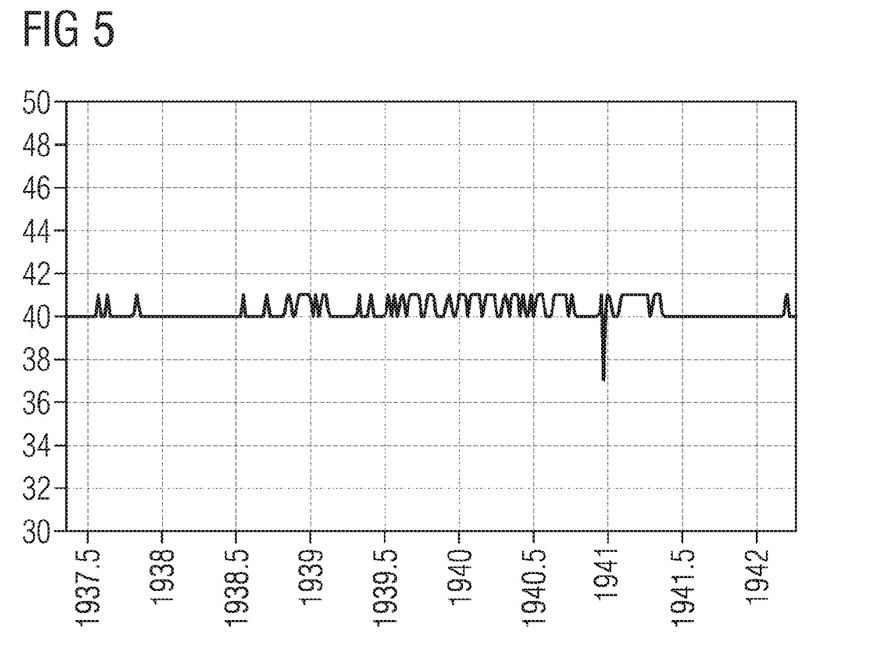
FIG. 5 depicts a first visualization of the measurement and evaluation of the change in the radio signals due to at least one of reflection, refraction, diffraction and absorption.

FIG. 5 depicts a first visualization of the measurement and evaluation of the change in the radio signals due to at least one of reflection, refraction, diffraction and absorption.

Figure 6:
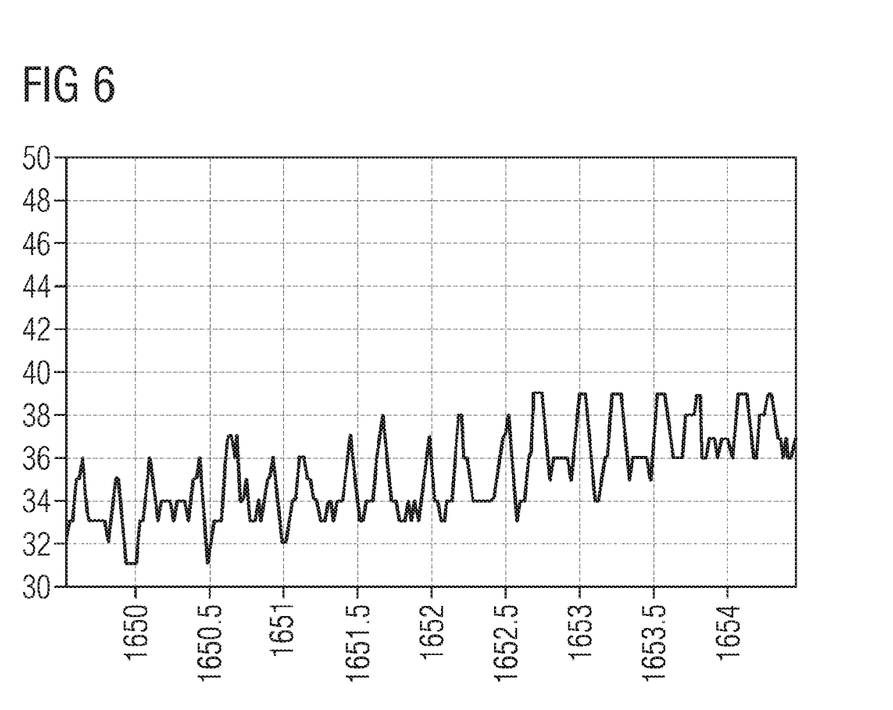
FIG. 6 depicts a second visualization of the measurement and evaluation of the change in the radio signals due to at least one of reflection, refraction, diffraction and absorption.

FIG. 6 shows a second visualization of the measurement and evaluation of the change in the radio signals due to at least one of reflection, refraction, diffraction and absorption.

Figure 7:
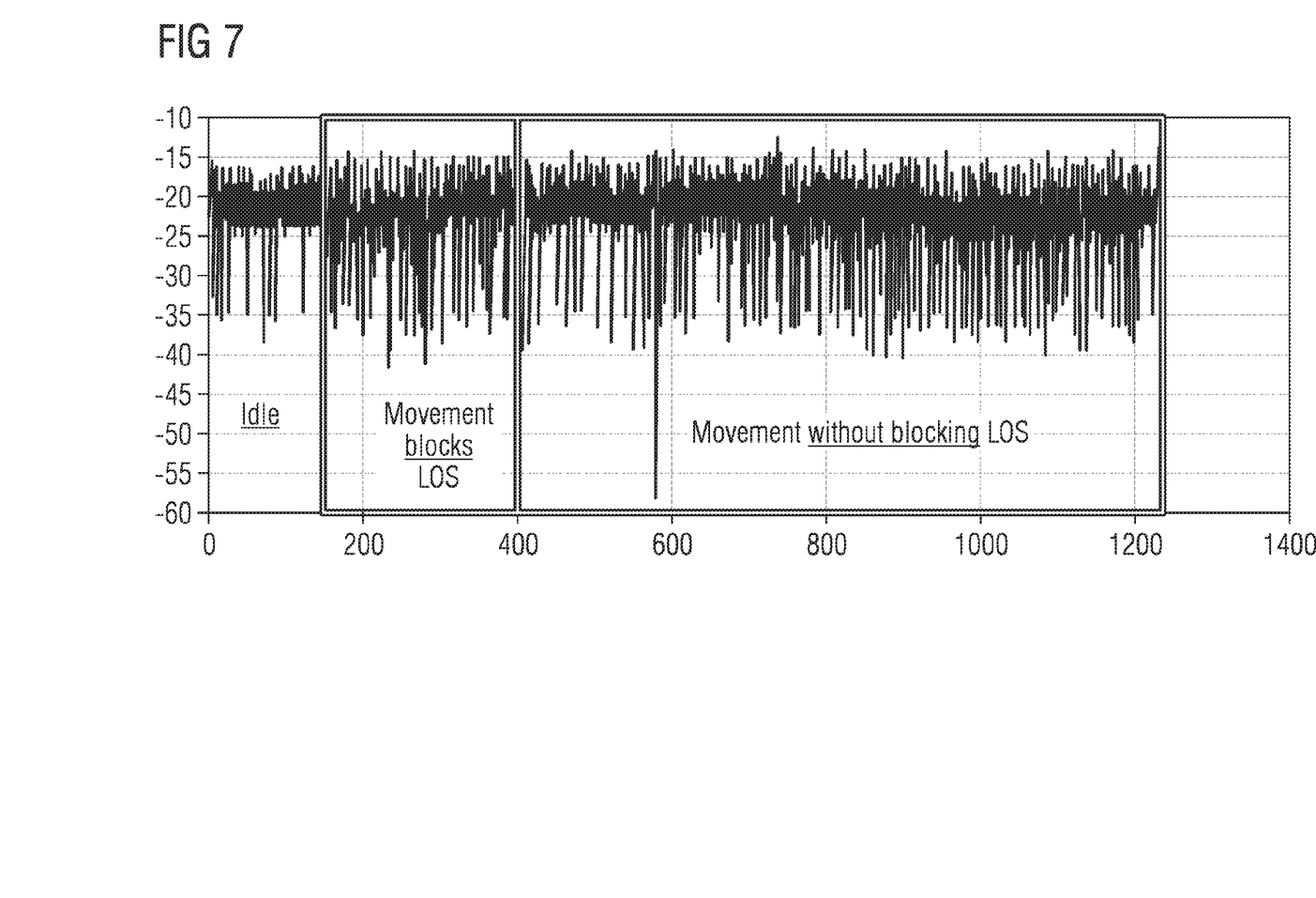
FIG. 7 depicts a third visualization of the measurement and evaluation of the change in the radio signals due to at least one of reflection, refraction, diffraction and absorption.

FIG. 7 depicts a third visualization of the measurement and evaluation of the change in the radio signals due to at least one of reflection, refraction, diffraction and absorption.

In these FIGURES the captured RSSI-data is visualized. In these images the horizontal axis is time in seconds and the vertical axis is the RSSI measured in e.g. CQI. In the first visualization in the FIG. 5 it can be seen that the signal is fairly stable, typically only varying from a base value by 1 dBm. In the second visualization in the FIG. 6 supported by the third visualization in the FIG. 7 it is clear that the signal is less stable. There is not a clear base level and the RSSI-changes by five to six dBm from one measurement to the next. It is often also the case that the base level that the RSSI returns to after it stabilizes is not the same base level that it was at before the signal disruption occurred. This makes using an algorithm that requires calibration with an empty room impractical. This illustrates well the importance of the use of the variance in the signal instead of some sort of comparison to a calibration period. If a comparison to a calibration period were used, it would be very difficult to detect instances when there is no movement but a new stability point. It was found that, independent of the testing environment, the sum of the variances of the signal strength over a given period of time will not exceed a certain amount unless there is movement in the environment. Therefore we avoid this calibration problem which is very common in other movement detection algorithms. The variance mentioned here is only an example of the signal processing; many other options exist.

In the various embodiments of the invention, a computer program product comprising a program code for executing the method for detecting movements (or lack of movements) run on at least one wireless enabled device or processor is foreseen. In these embodiments, a data carrier for storing the computer program product is preferably also foreseen.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for detecting movements of objects and/or living beings in a radio range without requiring the objects and/or living beings to include or carry a mobile device,
    wherein the radio range is a Fresnel zone in which the objects and/or living beings influence radio signals transmitted on a number of radio channels by at least one radio terminal, and received by a local fixed radio device in the radio range as well as given by communication between the radio terminal and the local radio device, the method comprising:
    a) collecting as input data for the movement detection in a <n>-th cycle with control variable neN, a <n>-th number of Received Signal Strength values related quantities regarding the communication, wherein the Received Signal Strength values related quantities are based on Received Signal Strength values for the communication, wherein the <n>-th number of Received Signal Strength values related quantities is 50, b) determining, based on the <n>-th number of Received Signal Strength values related quantities, a statistical parameter value, which is calculated at least for a fraction of the Received Signal Strength values related quantities, wherein the fraction includes more than two Received Signal Strength values related quantities, wherein the statistical parameter value is a value parameterized by at least one of an average of the squared differences from the mean, average of the absolute differences from the mean, and a square root of the average of the squared differences from the mean, c) comparing the statistical parameter value with an arbitrary predetermined threshold value not based on calibration in the Fresnel zone, and, c1) if the statistical parameter value either exceeds or equals the arbitrary predetermined threshold value, movement is detected and at least one detection data or at least one detection signal indicating a movement is output, c2) if the statistical parameter value does not exceed or equal the arbitrary predetermined threshold value, the control variable <n> is exceeded by "1" for additional i-th iterations of the collecting step a) with i=1,2,3, . . . k and k∈N, wherein a first additional iteration starts at i=1 and a last additional iteration ends at i=k, wherein for the additional i-th iteration in a <n+i>-th cycle, a <n+i>-th number of Received Signal Strength values related quantities are collected as input data for the movement detection, wherein the Received Signal Strength values related quantities are based on Received Signal Strength values for the communication, wherein the <n+i>-th number of Received Signal Strength values related quantities is 50, further wherein the <n>-th number and the <n+i>-th number are either equal or different from each other and the <n+i>-th number of Received Signal Strength values related quantities either replace at least partly the <n>-th number of Received Signal Strength values related quantities or complement the <n>-th number of Received Signal Strength values related quantities, and wherein step b) is repeated to determine a further statistical parameter value based on the <n+i>-th number of Received Signal Strength values related quantities; and step c) is repeated to compare the further statistical parameter value with the arbitrary predetermined threshold value.

2. The method according to claim 1, wherein at least one communication is present between the radio terminal and the local radio device and movement detection of objects and/or living beings in the radio range is either done for all communications of the at least one communication or for a selected communication of the at least one communication, wherein the selection of the communication is software-based/supported.

3. The method according to claim 1, wherein, when according to step c1) the detection data or the detection signal indicating the movement is outputted, a new movement detection is initiated, comprising repeating the steps a) to c) after a data reset of a previous movement detection.

4. The method according to claim 1, wherein the <n>-th and <n+i>-th number of Received Signal Strength values related quantities are arbitrary.

5. The method according to claim 1, wherein the at least one detection data or the at least one detection signal is used for automatically controlling an external device, wherein the external device is at least one of a domestic appliance, a facility for heating, climate control, lighting, security, or home automation, and a home entertainment device.

6. The method of claim 1, wherein the <n>-th number of Received Signal Strength values related quantities is at least one of a <n>-th number of Received Signal Strength Indication quantities, a <n>-th number of Signal to Noise Ratio quantities, a <n>-th number of Channel Quality Indication quantities, a <n>-th number of Packet Reception Rate quantities, a <n>-th number of Packet Loss Rate quantities, a <n>-th number of Signal to Interference Ratio quantities and a <n>-th number of Signal to Interference plus Noise Ratio quantities, and wherein the <n+i>-th number of Received Signal Strength values related quantities is at least one of a <n+i>-th number of Received Signal Strength Indication quantities, a <n+i>-th number of Signal to Noise Ratio quantities, <n+i>-th number of Channel Quality Indication quantities, <n+i>-th number of Packet Reception Rate quantities, a <n+i>-th number of Packet Loss Rate quantities, a <n+i>-th number of Signal to Interference Ratio quantities and a <n+i>-th number of Signal to Interference plus Noise Ratio quantities.

7. The method of claim 1, wherein the radio range is in an indoor area.

8. The method of claim 1, wherein the Received Signal Strength values are received for a <n>-th number of time frames at the local fixed radio device and wherein the times frames are consecutive.

9. The method according to claim 1, wherein the at least one detection data or the at least one detection signal is applied each in an area of the radio range in which the terminal is located.

10. A computer program product, comprising a computer readable hardware storage device having computer readable program code stored therein, said program code executable by a processor of a computer system to implement the method according to claim 1 when run on at least one wireless enabled device or processor.

11. A data carrier for storing the computer program product according to claim 10.

12. A digital tool for detecting movements of objects and/or living beings in a radio range without requiring the objects and/or living beings to include or carry a mobile device, wherein the radio range is a Fresnel zone in which the objects and/or living beings influence radio signals transmitted on a number of radio channels by at least one radio terminal, and received by a local fixed radio device in the radio range, as well as given by communication between the radio terminal and the local fixed radio device, wherein a program module for data processing is executable on a processor of the local fixed radio device designed such to:

a) collect as input data for the movement detection in a <n>-th cycle with control variable n∈N a <n>-th number of Received Signal Strength values related quantities regarding the communication, wherein the Received Signal Strength values related quantities are based on Received Signal Strength values for the communication, wherein the <n>-th number of Received Signal Strength values related quantities is 50, b) determine based on the <n>-th number of Received Signal Strength values related quantities a statistical parameter value, which is calculated at least for a fraction of the Received Signal Strength values quantities, wherein the fraction includes more than two Received Signal Strength values related quantities, wherein the statistical parameter value is a value parameterized by at least one of an average of the squared differences from the mean, average of the absolute differences from the mean, and a square root of the average of the squared differences from the mean,
  c) compare the statistical parameter value with an arbitrary predetermined threshold value not based on calibration in the Fresnel zone, and
    c1) if the statistical parameter value either exceeds or equals the arbitrary predetermined threshold value, at least one detection data or at least one detection signal indicating a movement is output,
    c2) if the statistical parameter value does not exceed or equal the arbitrary predetermined threshold value, the control variable is exceeded by "1" for additional i-th iterations of the collecting step a) with i=1,2,3, . . . k and k∈N, wherein a first additional iteration starts at i=1 and a last additional iteration ends at i=k,
  wherein for the additional i-th iteration in a <n+i>-th cycle, a <n+i>-th number of Received Signal Strength values related quantities are collected as input data for the movement detection,
  wherein the Received Signal Strength values related quantities are based on Received Signal Strength values for the communication,
  wherein the <n+i>-th number of Received Signal Strength values related quantities is 50, further
  wherein the <n>-th number and the <n+i>-th number are either equal or different from each other and the <n+i>-th number of Received Signal Strength values related quantities either replace at least partly the <n>-th number of Received Signal Strength values related quantities or complement the <n>-th number of Received Signal Strength values related quantities, and
  wherein step b) is repeated to determine a further statistical parameter value based on the <n+i>-th number of Received Signal Strength values related quantities; and step c) is repeated to compare the further statistical parameter value with the arbitrary predetermined threshold value.

13. A digital tool according to claim 12, wherein at least one communication is present between the radio terminal and the local radio device and the program module executable on the processor is designed such that the movement detection of objects and/or living beings in the radio range is either done for all communications of the at least one communication or for a selected communication of the at least one communication, whereby the selection of the communication is software-based/supported.

14. A digital tool according to claim 12, wherein the program module is downloadable from a server or cloud.

15. A digital tool according to claim 12, wherein the program module is uploadable via a "Universal Serial Bus"-stick.

16. A digital tool according to claim 12, wherein the program module being executable on the processor is designed such that when according to step c1) the detection data or the detection signal indicating the movement is outputted, a new movement detection is initiated, comprising repeating the steps a) to c) after a data reset of a previous movement detection.

17. A device for detecting movements of objects and/or living beings in a radio range without requiring the objects and/or living beings to include or carry a mobile device,
  wherein the radio range is a Fresnel zone in which the objects and/or living beings influence radio signals transmitted on a number of radio channels in the radio range by at least one radio terminal, and given by communication between the radio terminal and the device being fixed and localized, including:
  a radio interface including a radio program module receiving the transmitted radio signals and a processor with a computer-readable storage media and connected to the radio interface with the radio program module,
  wherein the processor executes for the movement detection a program module for data processing, which is stored or uploadable or downloadable into the storage media, such to:
    a) collect as input data for the movement detection in a <n>-th cycle with the control variable n∈N a <n>-th number of Received Signal Strength values related quantities regarding the communication, wherein the Received Signal Strength values related quantities are based on Received Signal Strength values for the communication, wherein the <n>-th number of Received Signal Strength values related quantities is 50,
    b) determine based on the <n>-th number of Received Signal Strength values related quantities a statistical parameter value, which is calculated at least for a fraction of the quantities, wherein the fraction includes more than two quantities, wherein the statistical parameter value is a value parameterized by at least one of an average of the squared differences from the mean, average of the absolute differences from the mean, and a square root of the average of the squared differences from the mean,
    c) compare the statistical parameter value with an arbitrary predetermined threshold value not based on calibration in the Fresnel zone, and
      c1) if the statistical parameter value either exceeds or equals the arbitrary predetermined threshold value, at least one detection data or at least one detection signal indicating a movement is output,
      c2) if the statistical parameter value does not exceed or equal the arbitrary predetermined threshold value, the control variable is exceeded by "1" for additional i-th iterations of the movement detection steps with i=1,2,3, . . . k and k∈N, wherein a first additional iteration starts at i=1 and a last additional iteration ends at i=k,
  wherein for the i-th iteration in a <n+i>-th cycle, a <n+i>-th number of Received Signal Strength values related quantities are collected as input data for the movement detection,
  wherein the Received Signal Strength values related quantities are based on Received Signal Strength values for the communication,
  wherein the <n+i>-th number of Received Signal Strength values related quantities is 50, further
  wherein the <n>-th number and the <n+i>-th number are either equal or different from each other and the <n+i>-th number of Received Signal Strength values related quantities either replace at least partly the <n>-th number of Received Signal Strength values related quantities or complement the <n>-th number of Received Signal Strength values related quantities, and wherein step b) is repeated to determine a further statistical parameter value based on the <n+i>-th number of Received Signal Strength values related quantities; and step c) is repeated to compare the further statistical parameter value with the arbitrary predetermined threshold value.

18. The device according to claim 17, wherein at least one communication is present between the radio terminal and the local radio device and the processor executes the program module for the movement detection such that the movement detection of objects and/or living beings in the radio range is either done for all communications of the at least one communication or for a selected communication of the at least one communication, whereby the selection of the communication is software-based/supported.

19. The device as claimed in claim 17, wherein the radio interface with the radio program module is a "Wireless Local Area Network" radio interface.

20. A system for detecting movements of objects and/or living beings in a radio range of an indoor area without requiring the objects and/or living beings to include or carry a mobile device, which influence radio signals of at least one radio terminal transmitted on a number of radio channels in the radio range, and given by a communication between the radio terminal and a device according to claim 17, including:
the device and an external device, wherein the external device contains a controller and a running control module thereon for automatically controlling the external device, the external device connected to the device and thereby forming a functional unit with the device such that when the device detects a movement of a living being, automatic control of the external device is carried out via the controller.

21. The system according to claim 20, wherein the external device is a domestic appliance or facility for heating, climate control, lighting, security or home automation and home entertainment.

22. The system according to claim 20, wherein the automatic controlling of the external device carried out via the controller is to switch on the external device, if it is switched off or to switch off the external device, if it is switched on.

23. A method for detecting movements or a lack of movements of objects and/or living beings in a radio range without requiring the objects and/or living beings to include or carry a mobile device,
wherein the radio range is a Fresnel zone in which the objects and/or living beings influence radio signals of at least one radio terminal,
wherein the radio signals are transmitted on a number of radio channels and are received by a local fixed radio device in the radio range, comprising:
collecting a value of at least one parameter describing at least one property of at least one radio channel of the number of radio channels for each time interval out of a predetermined number of time intervals, wherein the predetermined number of time intervals is 50,
deriving a value of a statistical parameter from the parameters of the time intervals, wherein the value of the statistical parameter is parameterized by at least one of an average of the squared differences from the mean, average of the absolute differences from the mean, and a square root of the average of the squared differences from the mean,
comparing the value of the statistical parameter with an arbitrary predetermined threshold value not based on calibration in the Fresnel zone, and
detecting movement if the comparison yields a predefined result, and starting a notification procedure, but
if the comparison does not yield the predefined result, proceeding to collect a further value of the at least one parameter describing the at least one property of the at least one radio channel for further time intervals,
deriving a further value of the statistical parameter from the parameters of the further time intervals, wherein the further value of the statistical parameter is parameterized by at least one of an average of the squared differences from the mean, average of the absolute differences from the mean, and a square root of the average of the squared differences from the mean, and
comparing the value of the statistical parameter with the arbitrary predetermined threshold value, such that the method is repeated until the comparison with the arbitrary predetermined threshold value yields the predefined result, movement is detected, and the notification procedure is started.

24. The method according to claim 23 wherein the notification procedure comprises contacting a predefined entity, or/and switching on electrical appliances.

* * * * *